United States Patent
Moinzadeh et al.

(10) Patent No.: US 7,733,853 B2
(45) Date of Patent: *Jun. 8, 2010

(54) VOICE CHANNEL CONTROL OF WIRELESS PACKET DATA COMMUNICATIONS

(75) Inventors: Kamyar Moinzadeh, Bellevue, WA (US); Darrin L. Garret, Kingston, WA (US); David C. Quimby, Seattle, WA (US)

(73) Assignee: AIRBIQUITY, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/372,255

(22) Filed: Feb. 17, 2009

(65) Prior Publication Data
US 2009/0154444 A1    Jun. 18, 2009

Related U.S. Application Data

(63) Continuation of application No. 11/048,623, filed on Jan. 31, 2005, now Pat. No. 7,508,810.

(51) Int. Cl.
H04L 12/66 (2006.01)

(52) U.S. Cl. .............. 370/353; 370/346; 370/493; 370/496

(58) Field of Classification Search ........... 370/346, 370/449, 493, 496, 353
See application file for complete search history.

(56) References Cited

U.S. PATENT DOCUMENTS

| 545,783 | A | 9/1895 | Charbonnier |
|---|---|---|---|
| 3,742,197 | A | 6/1973 | Pommerening |
| 3,971,888 | A | 7/1976 | Ching et al. |
| 4,158,748 | A | 6/1979 | En |
| 4,218,654 | A | 8/1980 | Ogawa |
| 4,310,722 | A | 1/1982 | Schaible |
| 4,355,310 | A | 10/1982 | Belaigues et al. |
| 4,368,987 | A | 1/1983 | Waters |

(Continued)

FOREIGN PATENT DOCUMENTS

CA    2242495    1/2000

(Continued)

OTHER PUBLICATIONS

"3rd Generation Partnership Project; Technical Specification Group Services and System Aspects Push architecture (Release 6); 3GPP TR 23.976"; ETSI Standards, LIS; vol. 3-SA2, no. V6.1.0, Jun. 1, 2004, pp. 1-34.

(Continued)

*Primary Examiner*—Min Jung
(74) *Attorney, Agent, or Firm*—Stolowitz Ford Cowger LLP

(57) ABSTRACT

A data session with a wireless device ordinarily cannot be initiated from the network side because the wireless device has no predetermined IP or other network address. Methods are disclosed for instead causing the wireless unit to initiate a data session with a target destination, thereby obviating the IP addressing problem. A voice call is first initiated by a requester application to a remote wireless unit. The requester transmits a request message to the remote wireless unit via the wireless voice channel using in-band techniques; preferably including a payload in the polling message that identifies the target destination. In response, the remote wireless unit initiates a packet data session with the target destination.

20 Claims, 2 Drawing Sheets

U.S. PATENT DOCUMENTS

| | | |
|---|---|---|
| 4,494,114 A | 1/1985 | Kaish |
| 4,494,211 A | 1/1985 | Schwartz |
| 4,539,557 A | 9/1985 | Redshaw |
| 4,577,343 A | 3/1986 | Oura |
| 4,598,272 A | 7/1986 | Cox |
| 4,599,583 A | 7/1986 | Shimozono |
| 4,607,257 A | 8/1986 | Noguchi |
| 4,641,323 A | 2/1987 | Tsang |
| 4,651,157 A | 3/1987 | Gray et al. |
| 4,656,463 A | 4/1987 | Anders |
| 4,675,656 A | 6/1987 | Narcisse |
| 4,750,197 A | 6/1988 | Denekamp |
| 4,754,255 A | 6/1988 | Sanders et al. |
| 4,766,589 A | 8/1988 | Fisher |
| 4,914,651 A | 4/1990 | Lusignan |
| 4,918,425 A | 4/1990 | Greenberg |
| 4,918,717 A | 4/1990 | Bissonnette |
| 4,926,444 A | 5/1990 | Hamilton |
| 4,941,155 A | 7/1990 | Chuang et al. |
| 4,984,238 A | 1/1991 | Watanabe |
| 5,014,344 A | 5/1991 | Goldberg |
| 5,025,455 A | 6/1991 | Nguyen et al. |
| 5,040,214 A | 8/1991 | Grossberg |
| 5,043,736 A | 8/1991 | Darnell et al. |
| 5,081,067 A | 1/1992 | Drori et al. |
| 5,095,307 A | 3/1992 | Shimura |
| 5,119,403 A | 6/1992 | Krishnan |
| 5,119,504 A | 6/1992 | Durboraw, III |
| 5,134,644 A | 7/1992 | Garton |
| 5,155,689 A | 10/1992 | Wortham |
| 5,201,071 A | 4/1993 | Webb |
| 5,203,012 A | 4/1993 | Patsiokas |
| 5,212,831 A | 5/1993 | Chuang et al. |
| 5,218,618 A | 6/1993 | Sagey |
| 5,223,844 A | 6/1993 | Mansell |
| 5,227,776 A | 7/1993 | Starefoss |
| 5,235,633 A | 8/1993 | Dennison et al. |
| 5,245,634 A | 9/1993 | Averbuch |
| 5,245,647 A | 9/1993 | Grouffal |
| 5,282,204 A | 1/1994 | Shpancer |
| 5,289,372 A | 2/1994 | Guthrie |
| 5,301,353 A | 4/1994 | Borras |
| 5,301,359 A | 4/1994 | Van Den Heuvel |
| 5,305,384 A | 4/1994 | Ashby |
| 5,317,309 A | 5/1994 | Vercellotti |
| 5,331,635 A | 7/1994 | Ota |
| 5,333,175 A | 7/1994 | Ariyavisitakul et al. |
| 5,334,974 A | 8/1994 | Simms et al. |
| 5,347,272 A | 9/1994 | Ota |
| 5,363,375 A | 11/1994 | Chuang et al. |
| 5,363,376 A | 11/1994 | Chuang et al. |
| 5,365,450 A | 11/1994 | Schuchman |
| 5,379,224 A | 1/1995 | Brown |
| 5,381,129 A | 1/1995 | Boardman |
| 5,388,147 A | 2/1995 | Grimes |
| 5,388,247 A | 2/1995 | Goodwin |
| 5,389,934 A | 2/1995 | Kass |
| 5,390,216 A | 2/1995 | Bilitza |
| 5,396,539 A | 3/1995 | Slekys |
| 5,408,684 A | 4/1995 | Yunoki |
| 5,410,541 A | 4/1995 | Hotto |
| 5,410,739 A | 4/1995 | Hart |
| 5,414,432 A | 5/1995 | Penny, Jr. |
| 5,418,537 A | 5/1995 | Bird |
| 5,420,592 A | 5/1995 | Johnson |
| 5,422,816 A | 6/1995 | Sprague |
| 5,428,636 A | 6/1995 | Meier |
| 5,438,337 A | 8/1995 | Aguado |
| 5,440,491 A | 8/1995 | Kawano |
| 5,448,622 A | 9/1995 | Huttunen |
| 5,459,469 A | 10/1995 | Schuchman |
| 5,461,390 A | 10/1995 | Hoshen |
| 5,475,864 A | 12/1995 | Hamabe |
| 5,475,868 A | 12/1995 | Duque-Anton |
| 5,479,480 A | 12/1995 | Scott |
| 5,479,482 A | 12/1995 | Grimes |
| 5,483,549 A | 1/1996 | Weinberg |
| 5,491,690 A | 2/1996 | Alfonsi |
| 5,497,149 A | 3/1996 | Fast |
| 5,504,491 A | 4/1996 | Chapman |
| 5,506,888 A | 4/1996 | Hayes |
| 5,509,035 A | 4/1996 | Teidemann, Jr. |
| 5,510,797 A | 4/1996 | Abraham |
| 5,513,111 A | 4/1996 | Wortham |
| 5,515,043 A | 5/1996 | Berard et al. |
| 5,519,403 A | 5/1996 | Bickley |
| 5,519,621 A | 5/1996 | Wortham |
| 5,528,232 A | 6/1996 | Verma |
| 5,530,701 A | 6/1996 | Stillman |
| 5,537,458 A | 7/1996 | Suomi |
| 5,539,810 A | 7/1996 | Kennedy, III |
| 5,543,789 A | 8/1996 | Behr et al. |
| 5,544,222 A | 8/1996 | Robinson |
| 5,544,225 A | 8/1996 | Kennedy, III |
| 5,546,445 A | 8/1996 | Dennison |
| 5,550,551 A | 8/1996 | Alesio |
| 5,551,066 A | 8/1996 | Stillman |
| 5,555,286 A | 9/1996 | Tendler |
| 5,555,520 A | 9/1996 | Barzegar et al. |
| 5,557,254 A | 9/1996 | Johnson et al. |
| 5,565,858 A | 10/1996 | Guthrie |
| 5,566,173 A | 10/1996 | Steinbrecher |
| 5,572,204 A | 11/1996 | Timm et al. |
| 5,576,716 A | 11/1996 | Sadler |
| 5,587,715 A | 12/1996 | Lewis |
| 5,590,396 A | 12/1996 | Henry |
| 5,594,425 A | 1/1997 | Ladner |
| RE35,498 E | 4/1997 | Barnard |
| 5,619,684 A | 4/1997 | Goodwin |
| 5,621,388 A | 4/1997 | Sherburne |
| 5,625,668 A | 4/1997 | Loomis |
| 5,627,517 A | 5/1997 | Theimer |
| 5,630,206 A | 5/1997 | Urban |
| 5,640,444 A | 6/1997 | O'Sullivan |
| 5,650,770 A | 7/1997 | Schlager |
| 5,663,734 A | 9/1997 | Krasner |
| 5,666,357 A | 9/1997 | Jangi |
| 5,668,803 A * | 9/1997 | Tymes et al. ................ 370/312 |
| 5,673,305 A | 9/1997 | Ross |
| 5,680,439 A | 10/1997 | Aguilera |
| 5,686,910 A | 11/1997 | Timm |
| 5,687,215 A | 11/1997 | Timm |
| 5,687,216 A | 11/1997 | Svensson |
| 5,691,980 A | 11/1997 | Welles |
| 5,703,598 A | 12/1997 | Emmons |
| 5,711,013 A | 1/1998 | Collett |
| 5,712,619 A | 1/1998 | Simkin |
| 5,712,899 A | 1/1998 | Pace |
| 5,724,243 A | 3/1998 | Westerlage |
| 5,726,893 A | 3/1998 | Schuchman et al. |
| 5,726,984 A | 3/1998 | Kubler |
| 5,731,757 A | 3/1998 | Layson |
| 5,732,326 A | 3/1998 | Maruyama |
| 5,734,981 A | 3/1998 | Kennedy |
| 5,742,233 A | 4/1998 | Hoffman |
| 5,748,083 A | 5/1998 | Rietkerk |
| 5,748,084 A | 5/1998 | Isikoff |
| 5,751,246 A | 5/1998 | Hertel |
| 5,752,186 A | 5/1998 | Malackowski |
| 5,752,193 A | 5/1998 | Scholefield |
| 5,752,195 A | 5/1998 | Tsuji et al. |
| 5,754,554 A | 5/1998 | Nakahara |
| D395,250 S | 6/1998 | Kabler |
| 5,761,204 A | 6/1998 | Grob |

| | | | | | | |
|---|---|---|---|---|---|---|
| 5,761,292 | A | 6/1998 | Wagner et al. | 6,038,595 | A | 3/2000 | Ortony |
| 5,771,001 | A | 6/1998 | Cobb | 6,041,124 | A | 3/2000 | Sugita |
| 5,771,455 | A | 6/1998 | Kennedy, III | 6,044,257 | A | 3/2000 | Boling |
| 5,774,876 | A | 6/1998 | Woolley | 6,049,971 | A | 4/2000 | Ben-Yehezhel et al. |
| 5,781,156 | A | 7/1998 | Krasner | 6,055,434 | A | 4/2000 | Seraj |
| 5,784,422 | A | 7/1998 | Heermann | 6,057,756 | A | 5/2000 | Engellenner |
| 5,786,789 | A | 7/1998 | Janky | 6,067,044 | A | 5/2000 | Whelan |
| 5,794,124 | A | 8/1998 | Ito | 6,067,457 | A | 5/2000 | Erickson |
| 5,796,808 | A | 8/1998 | Scott | 6,069,570 | A | 5/2000 | Herring |
| 5,797,091 | A | 8/1998 | Clisel | 6,070,089 | A | 5/2000 | Brophy |
| 5,804,810 | A | 9/1998 | Wolley | 6,075,458 | A | 6/2000 | Ladner |
| 5,805,576 | A | 9/1998 | Worley, III | 6,076,099 | A | 6/2000 | Chen |
| 5,812,087 | A | 9/1998 | Krasner | 6,091,969 | A | 7/2000 | Brophy |
| 5,812,522 | A | 9/1998 | Lee et al. | 6,097,760 | A | 8/2000 | Spicer |
| 5,815,114 | A | 9/1998 | Speasl | 6,101,395 | A | 8/2000 | Keshavachar |
| RE35,916 | E | 10/1998 | Dennison et al. | 6,122,271 | A | 9/2000 | McDonald |
| 5,825,283 | A | 10/1998 | Camhi | 6,122,514 | A | 9/2000 | Spaur |
| 5,825,327 | A | 10/1998 | Krasner | 6,131,067 | A | 10/2000 | Girerd |
| 5,826,188 | A | 10/1998 | Tayloe | 6,140,956 | A | 10/2000 | Hillman |
| 5,831,574 | A | 11/1998 | Krasner | 6,144,336 | A | 11/2000 | Preston et al. |
| 5,832,394 | A | 11/1998 | Wortham | 6,151,493 | A | 11/2000 | Sasakura |
| 5,835,907 | A | 11/1998 | Newman | 6,154,658 | A | 11/2000 | Caci |
| 5,838,237 | A | 11/1998 | Revell | 6,166,688 | A | 12/2000 | Cromer |
| 5,841,396 | A | 11/1998 | Krasner | 6,169,497 | B1 | 1/2001 | Robert |
| 5,842,141 | A | 11/1998 | Vaihoja | 6,173,194 | B1 | 1/2001 | Vanttila |
| 5,850,392 | A | 12/1998 | Wang | 6,175,307 | B1 | 1/2001 | Peterson |
| 5,856,986 | A | 1/1999 | Sobey | 6,181,253 | B1 | 1/2001 | Enshenbach |
| 5,864,763 | A | 1/1999 | Leung | 6,195,736 | B1 | 2/2001 | Lisle |
| 5,870,675 | A | 2/1999 | Tuutijärvi et al. | 6,208,959 | B1 | 3/2001 | Jonsson |
| 5,874,914 | A | 2/1999 | Krasner | 6,212,207 | B1 | 4/2001 | Nicholas |
| 5,881,069 | A | 3/1999 | Cannon | 6,226,529 | B1 | 5/2001 | Bruno |
| 5,881,373 | A | 3/1999 | Elofsson | 6,236,652 | B1 | 5/2001 | Preston et al. |
| 5,884,214 | A | 3/1999 | Krasner | 6,249,227 | B1 | 6/2001 | Brady |
| 5,886,634 | A | 3/1999 | Muhme | 6,266,008 | B1 | 7/2001 | Huston |
| 5,892,441 | A | 4/1999 | Woolley | 6,269,392 | B1 | 7/2001 | Cotichini |
| 5,892,454 | A | 4/1999 | Schipper | 6,272,315 | B1 | 8/2001 | Chang |
| 5,901,179 | A | 5/1999 | Urabe | 6,275,990 | B1 | 8/2001 | Dapper |
| 5,912,886 | A | 6/1999 | Takahashi | 6,282,430 | B1 | 8/2001 | Young |
| 5,913,170 | A | 6/1999 | Wortham | 6,288,645 | B1 | 9/2001 | McCall |
| 5,917,449 | A | 6/1999 | Sanderford | 6,295,461 | B1 | 9/2001 | Palmer |
| 5,918,180 | A | 6/1999 | Dimino | 6,300,863 | B1 | 10/2001 | Cotchini |
| 5,930,340 | A | 7/1999 | Bell | 6,300,875 | B1 | 10/2001 | Schafer |
| 5,930,722 | A | 7/1999 | Han | 6,301,480 | B1 | 10/2001 | Kennedy |
| 5,933,468 | A | 8/1999 | Kingdon | 6,304,186 | B1 | 10/2001 | Rabanne |
| 5,936,526 | A | 8/1999 | Klein | 6,304,637 | B1 | 10/2001 | Mirashrafi |
| 5,937,355 | A | 8/1999 | Joong | 6,307,471 | B1 | 10/2001 | Xydis |
| 5,940,598 | A | 8/1999 | Strauss | 6,308,060 | B2 | 10/2001 | Wortham |
| 5,945,944 | A | 8/1999 | Krasner | 6,320,535 | B1 | 11/2001 | Hillman |
| 5,946,304 | A | 8/1999 | Chapman | 6,327,533 | B1 | 12/2001 | Chou |
| 5,946,611 | A | 8/1999 | Dennison | 6,343,217 | B1 | 1/2002 | Borland |
| 5,949,335 | A | 9/1999 | Maynard | 6,345,251 | B1 | 2/2002 | Ericsson |
| 5,953,694 | A | 9/1999 | Pillekamp | 6,351,495 | B1 | 2/2002 | Tarraf |
| 5,960,363 | A | 9/1999 | Mizikocsky | 6,359,923 | B1 | 3/2002 | Agee |
| 5,961,608 | A | 10/1999 | Onosaka | 6,362,736 | B1 | 3/2002 | Gehlot |
| 5,963,130 | A | 10/1999 | Schlager | 6,373,842 | B1 | 4/2002 | Coverdale |
| 5,963,134 | A | 10/1999 | Bowers | 6,405,033 | B1 | 6/2002 | Kennedy, III |
| 5,970,130 | A | 10/1999 | Katko | 6,434,198 | B1 | 8/2002 | Tarraf |
| 5,978,676 | A | 11/1999 | Guridi | 6,466,582 | B2 | 10/2002 | Preston |
| 5,991,279 | A | 11/1999 | Haugli | 6,470,046 | B1 | 10/2002 | Scott |
| 5,999,124 | A | 12/1999 | Sheynblat | 6,477,633 | B1 | 11/2002 | Grimmett |
| 5,999,126 | A | 12/1999 | Ito | 6,493,338 | B1 | 12/2002 | Preston et al. |
| 6,002,363 | A | 12/1999 | Krasner | 6,516,198 | B1 | 2/2003 | Tendler |
| 6,009,325 | A | 12/1999 | Retzer | 6,519,260 | B1 | 2/2003 | Galyas |
| 6,009,338 | A | 12/1999 | Iwata | 6,522,265 | B1 | 2/2003 | Hillman |
| 6,011,973 | A | 1/2000 | Valentine | 6,526,026 | B1 | 2/2003 | Menon |
| 6,014,089 | A | 1/2000 | Tracy | 6,529,744 | B1 | 3/2003 | Birkler |
| 6,014,090 | A | 1/2000 | Rosen et al. | 6,611,804 | B1 | 8/2003 | Ericsson |
| 6,014,376 | A | 1/2000 | Abreu | 6,614,349 | B1 | 9/2003 | Proctor |
| 6,021,163 | A | 2/2000 | Hoshi | 6,617,979 | B2 | 9/2003 | Yoshioka |
| 6,024,142 | A | 2/2000 | Bates | 6,628,967 | B1 | 9/2003 | Yue |
| 6,031,489 | A | 2/2000 | Wyrwas | 6,665,333 | B2 | 12/2003 | McCrady |
| 6,032,037 | A | 2/2000 | Jeffers | 6,681,121 | B1 | 1/2004 | Preston |
| 6,038,310 | A | 3/2000 | Hollywood | 6,683,855 | B1 | 1/2004 | Bordogna |

| | | | |
|---|---|---|---|
| 6,690,681 B1 | 2/2004 | Preston et al. | |
| 6,690,922 B1 | 2/2004 | Lindemann | |
| 6,697,987 B2 | 2/2004 | Lee | |
| 6,700,867 B2 | 3/2004 | Classon | |
| 6,754,265 B1 | 6/2004 | Lindemann | |
| 6,771,629 B1 | 8/2004 | Preston | |
| 6,778,645 B1 | 8/2004 | Rao | |
| 6,836,515 B1 | 12/2004 | Kay | |
| 6,917,449 B2 | 7/2005 | Sanderford | |
| 6,993,362 B1 | 1/2006 | Aberg | |
| 7,151,768 B2 | 12/2006 | Preston | |
| 7,164,662 B2 | 1/2007 | Preston | |
| 7,206,305 B2 | 4/2007 | Preston | |
| 7,221,669 B2 | 5/2007 | Preston | |
| 7,269,188 B2 | 9/2007 | Smith | |
| 7,317,696 B2 | 1/2008 | Preston | |
| 7,398,100 B2 | 7/2008 | Harris | |
| 7,483,418 B2 | 1/2009 | Maurer | |
| 7,511,611 B2 | 3/2009 | Sabino | |
| 2002/0057678 A1* | 5/2002 | Jiang et al. | 370/353 |
| 2002/0095293 A1 | 7/2002 | Gallagher et al. | |
| 2002/0101975 A1 | 8/2002 | Tiburtius et al. | |
| 2002/0111167 A1 | 8/2002 | Nguyen et al. | |
| 2002/0122401 A1 | 9/2002 | Xiang et al. | |
| 2003/0016639 A1 | 1/2003 | Kransmo et al. | |
| 2003/0083080 A1 | 5/2003 | Fournier et al. | |
| 2003/0088619 A1 | 5/2003 | Boundy | |
| 2003/0128134 A1* | 7/2003 | Fierro et al. | 340/870.02 |
| 2003/0147401 A1 | 8/2003 | Kyronaho | |
| 2004/0034529 A1 | 2/2004 | Hooper, III | |
| 2004/0171370 A1 | 9/2004 | Natarajan | |
| 2004/0209614 A1 | 10/2004 | Bright | |
| 2005/0090225 A1 | 4/2005 | Muehleisen et al. | |
| 2005/0102529 A1* | 5/2005 | Buddhikot et al. | 713/200 |
| 2005/0147057 A1 | 7/2005 | LaDue | |
| 2005/0197137 A1 | 9/2005 | Radic et al. | |
| 2005/0215228 A1 | 9/2005 | Fostick et al. | |
| 2005/0226202 A1 | 10/2005 | Zhang et al. | |
| 2006/0246910 A1 | 11/2006 | Petermann | |
| 2006/0276196 A1* | 12/2006 | Jiang et al. | 455/446 |
| 2007/0087756 A1 | 4/2007 | Hoffberg | |
| 2008/0056469 A1* | 3/2008 | Preston et al. | 379/93.05 |
| 2008/0132200 A1 | 6/2008 | Shinoda | |
| 2008/0143497 A1 | 6/2008 | Wasson et al. | |

FOREIGN PATENT DOCUMENTS

| | | |
|---|---|---|
| DE | 44 24 412 A1 | 1/1996 |
| EP | 0 242 099 A2 | 10/1987 |
| EP | 0 528 090 A1 | 8/1991 |
| EP | 0501058 | 9/1992 |
| EP | 0 545 783 A1 | 11/1992 |
| EP | 0 545 753 A1 | 6/1993 |
| EP | 0580397 | 1/1994 |
| EP | 0889610 A2 | 1/1999 |
| EP | 0 896 442 A1 | 2/1999 |
| EP | 01 950 402 | 12/2004 |
| GB | 2 290 005 A | 5/1994 |
| JP | 03232349 | 10/1991 |
| JP | 5130008 | 5/1993 |
| JP | 5252099 | 9/1993 |
| JP | 6077887 | 3/1994 |
| JP | 11109062 | 4/1999 |
| WO | 8912835 | 12/1989 |
| WO | WO 9107044 | 5/1991 |
| WO | WO 9521511 | 8/1995 |
| WO | WO 9607110 | 3/1996 |
| WO | WO 9615636 | 5/1996 |
| WO | WO 9618275 | 6/1996 |
| WO | WO 9834164 | 8/1998 |
| WO | WO 9834359 | 8/1998 |
| WO | WO 9853573 | 11/1998 |
| WO | WO 9859256 | 12/1998 |
| WO | WO 9859257 | 12/1998 |
| WO | WO 9956143 | 4/1999 |
| WO | WO 9936795 | 7/1999 |
| WO | WO 9949677 | 9/1999 |
| WO | 9956144 | 11/1999 |
| WO | WO 0011893 | 3/2000 |
| WO | 0178249 | 10/2001 |
| WO | WO 0178249 A2 | 12/2001 |
| WO | WO 02054694 A1 | 7/2002 |
| WO | 03034235 | 4/2003 |

OTHER PUBLICATIONS

3GGP2 Access Network Interfaces Technical Specification Group, "3GGP2 Access Network Interfaces TSG (TSG-A) #60, Meeting Summary," Coeur d'Alene, Idaho, Apr. 19, 2004. pp. 1-5.

Protean Research Group, "Anycast Routing for Mobile Services (ARMS) Project Overview," Published on the Internet at <http://tang.itd.nrl.navy.mil/5522/anycast/anycast_index.html>.

International Search Report for PCT/US06/03416, dated Feb. 5, 2007, 3 pages.

Written Opinion of the International Searching Authority for PCT/US06/03416, dated Feb. 5, 2007, 3 pages.

Vaha-Sipila, A., URLs for Telephone Calls, Request for Comments: 2806, Network Working Group, Apr. 2000, 16 pages.

U.S. Appl. No. 60/047,034 to Preston, filed May 19, 1997.

U.S. Appl. No. 60/047,140 to Preston, filed May 20, 1997.

U.S. Appl. No. 60/048,369 to Preston, filed Jun. 3, 1997.

U.S. Appl. No. 60/048,385 to Preston, filed Jun. 3, 1997.

U.S. Appl. No. 60/055,497 to Preston, filed Aug. 12, 1997.

"Tracking," published on the Internet at http://www.wisetrack.com/tracking.html, posted May 29, 2002, Copyright 2001 by TVL, Inc.

Office Action in U.S. Appl. No. 09/625,159, dated Apr. 9, 2003; 15 pages.

Office Action in U.S. Appl. No. 09/677,486, dated Oct. 16, 2001; 9 pages.

Bilbao, Alfonso, m-Security (Security and Mobile Telephony), Proceedings of the IEEE 35th Annual 2001, International Carnahan Conference on Security Technology, Oct. 16-19, 2001.

Brian W. Martin, "Watchlt: A Fully Supervised Identification, Location and Tracking System," Proceedings of the IEEE, 29th Annual 1995 International Carnahan Conference on Security Technology, Oct. 1995.

Brown, et al., "A Reconfigurable Modem for Increased Network . . . " IEEE Trans. On Circuits & Systems for Video Technology, vol. 6, No. 2, Apr. 1996, pp. 215-224.

Christ, Thomas W., "A Prison Guard Duress Alarm Location System," Proceedings of the IEEE 1993 International Carnahan Conference on Security Technology: Security Technology, Oct. 13-15, 1993, Copyright 1993 IEEE.

Coleman et al., Subjective Performance Evaluation of the RPE-LTP Codec for the Pan-European Cellular Digital Radio Sys. Nov. 27-30, 1989, pp. 758-761; 1075-1079, IEEE.

Coleman, A., et al., "Subjective Performance Evaluation of the RPE-LTP Codec for the Pan-European Cellular Digital Mobile Radio System," Globecom '89, IEEE Global Telecommunications Conference and Exhibition, vol. 2, 27-30, Nov. 1989, pp. 1075-1079, IEEE, New York, New York.

Digital Cellular Telecommunications System (Phase 2+); GSM 06.31 version 8.0.1 Release 1999. ETSI EN 300 964 V8.01 (Nov. 2000), pp. 1-13. European Standard (Telecommunications serier). (http://www.etsi.org).

FCC E911 Order, CC Docket No. 94-102; dated Nov. 23, 1998.

Feher, "MODEMS for Emerging Digital Cellular-Mobile Radio System," IEEE Trans. On Vehicular Technology, vol. 40, No. 2, May 1991, pp. 355-365.

International Search Report and Written Opinion of International Application No. PCT/US07/64443, dated Sep. 15, 2008.

International Search Report PCT/US00/01157; dated May 23, 2000.

International Search Report PCT/US00/13288; dated May 15, 2000.

International Search Report PCT/US01/19845; dated Jun. 22, 2001.

International Search Report PCT/US01/20021, dated Aug. 21, 2001.

International Search Report PCT/US01/27238; dated Aug. 30, 2001.

Lavigne, R.E. and P. Eng, "Trunking Versus Conventional Radio System," Proceedings of the IEEE, 34th Annual 2000 International Carnahan Conference on Security Technology, Oct. 23-25, 2000.

Lin, D., et al., "Data Compression of voiceband Modem Signals," 40th IEEE Vehicular Technology Conference: On the Move in the 90's. May 6-9 1990, pp. 323-325, IEEE, New York, New York.

Lockwood Technology Corporation, "Asset Management," copyright 2002 by Lockwood Technology Corporation, published on the Internet at http://www.lockwoodtechnology.com/asset_tracking.html, printed May 29, 2002.

McNichols, Shawn, "Keeping Your Assets Safe," published on the Internet at http://www.securitymagazine.com,CDA/ArticleInformation/features/BNP_Features, posted Feb. 14, 2002, Copyright 2001-2002 by Business News Publishing Co.

Mueller, A.J. et al., "A DSP Implemented dual 9600/7200 BPS TCM Modem for Mobile Communications Over FM Voice Radios," Proceedings of the 1997 6th IEEE Pacific rim Conference on Communications, Computers and Signal Processing, vol. 2, 20-22, Aug. 1997, pp. 758-761, IEEE, New York, New York.

Phifer, Lisa A., Surfing the Web Over Wireless, Jan. 1998, http://www.corecom.com/html/ wireless.html, printed May 22, 2007.

International Search Report PCT/US02/00996; dated Jun. 24, 2002.

Jain et al, Potential Networking Applications of Global Positioning Systems (GPS), downloadable at http://www.cis.ohio-state.edu/~jain/papers/gps.htm, pp. 1-40, Apr. 1996.

Janus Technologies, Inc., "ProxTrak Asset Tracking Interface," copyright 2000 Janus Technologies, Inc., published on the Internet at http://www.janus-tech.com/Products/ProxTrax. html, printed May 29, 2002.

3rd Generation Partnership Project; Technical Specification Group Services and System Aspects Push Architecture (Rel. 6); 3GPP TR 23.976; vol. 3-SA2, no. V6.1.0; Jun. 1, 2004; pp. 1-34.

International Preliminary Report on Patentability in PCT/US2006/022985 dated Jan. 3, 2008; 6 pages.

* cited by examiner

VOICE CHANNEL CONTROL OF WIRELESS PACKET DATA COMMUNICATIONS

CROSS REFERENCE TO RELATED APPLICATIONS

This application is a continuation of U.S. application Ser. No. 11/048,623, filed Jan. 31, 2005, now U.S. Pat. No. 7,508, 810 which is incorporated by reference herein in its entirety.

COPYRIGHT NOTICE

© 2005 Airbiquity Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This invention pertains to data communications via wireless communications networks, and more specifically it relates to use of the voice channel to trigger a network initiated data session such as an IP session.

BACKGROUND OF THE INVENTION

Data transfer services in the wireless domain are known and certainly still evolving. Examples include SMS (short messaging service) and other SS7 control channel services. They can be used, for example, for text messaging. They do not affect the voice channels, but offer very limited bandwidth, so the amounts of data transferred are quite limited.

The WAP (Wireless Application Protocol) specifications and software offer some improved services. For example, they can be implemented to provide limited Internet access to a mobile unit. (We use the term "mobile unit" herein to refer broadly to any device with wireless connectivity, including without limitation a cell phone, PDA, laptop computer, palmtop, motor vehicle, etc.). The WAP services, however, require that the mobile unit itself be WAP enabled, and that the wireless carrier network also be WAP enabled. Thus, wireless carriers have to deploy and maintain WAP gateways at the edges of the network to provide WAP services. Some mobile units, and some networks or geographic areas may not be WAP enabled, so these services would not be available for data communication.

One approach to wireless data transfer that does not require changes in the wireless network infrastructure, although it requires specific implementation at both endpoints of a session, is the use of "in-band" data transfer. As the name implies, this technique transfers data in the voice channel, using carefully selected and timed audio frequency tones. (Commonly, wireless data transfer services do not use the voice channel at all.) In-band or voice channel data transfer can be done with little or no interruption of a voice conversation. Details of in-band signaling are explained in U.S. Pat. Nos. 6,144,336; 6,690,681 and 6,493,338 all incorporated wherein by this reference. These types of in-voice-channel data communications have two primary advantages: the wireless voice channel is reliable, and the technique works transparently across networks and carriers throughout the country and beyond. The data simply passes transparently through the voice service, as it "looks" like voice. However, in-band signaling provides only a very low bandwidth up to around 400 bps. That makes it almost useless for transferring significant amounts of data.

Higher bandwidth wireless data services are rapidly becoming available throughout the world. These services operate over dedicated data channels, not the voice channels. The newer specifications, so-called "3G" or third generation wireless technologies, while not yet widely implemented, promise packet data rates as follows, according to IMT-2000 standards:

2 Mbps for fixed environment
384 Mbps for pedestrian (i.e. slow-moving mobile unit)
144 kbps for vehicular traffic One problem, however, with virtually all wireless data services, is the difficulty in accessing those services in a network "polling" type of application. Polling (or "pulling data") here refers to contacting a mobile unit to pull or retrieve digital data needed by a requester. (The "requester" typically would be an application program.) Preferably, an authorized requester should be able to poll remote mobile units, and fetch data, without manual user intervention at the remote location. In other words, a polling process should be able to be completely automated, although for some applications it can be advantageously initiated by a user at the requester end.

To illustrate, a wireless automated inventory control system may seek to poll units, say trucks or tanks, to learn their present location, fuel supply, operator ID, etc. A packet data connection, for example an IP connection, cannot be established with a mobile unit from the network side (we call this "network initiated") using prior technology, because the mobile device has no predetermined IP address. Rather, an IP address is dynamically assigned to a mobile unit only if and when it initiates a session to an IP network. Accordingly, a user application cannot poll a remote mobile unit to establish a packet data transfer session using known technologies.

A system has been suggested for IP addressing of GPRS mobile terminals that purportedly would enable TCP/IP connection without a phone call. That proposal recognized that there are not enough IP addresses available (under the current Ipv4 regime) to assign one to every wireless terminal. The proposal calls for a combination of Public Addresses (registered with public routing tables) and Private addresses, not to be routed on the public Internet. Rather, the private (IP-like) addresses would only be used within a GPRS operator's own network. This would require network address translation (NAT) facilities and is generally impractical. Even if implemented, such a scheme does not solve the problem that the mobile (or wireless) terminal address is unknown, and is not publicly discoverable in a convenient way.

The need remains for a convenient and effective way to poll a remote mobile unit, that is, to request a data packet session, for uploading or downloading data via the wireless network, without changing the wireless carrier infrastructure and in a manner compatible with existing packet data networks and protocols such as IP.

SUMMARY

In accordance with one embodiment of the present invention, a combination of in-band or voice channel signaling together with packet data services is employed to overcome the lack of a predetermined IP address of a mobile unit. A voice call is established between a requester and the remote mobile unit. A short polling message is transmitted in the voice channel from the requester using in-band digital data transmission ("IBS"). The request message includes in its payload data that identifies (directly or indirectly) a target resource such as a URL or IP address. The mobile unit responds by initiating a wireless packet data session with the indicated target resource which may be, for example, a server system.

This new approach of using the voice channel signaling to enable a network initiated data session will solve the existing problem associated with assigning an IP address (Simple IP and Mobile IP assignment for both IPv4 and IPv6) to a mobile device and do so in a timely and more efficient manner.

Presently the existing cellular infrastructure does not allow mobile devices to pre-register their IP address with the cellular data network, instead it must be assigned to the mobile device by the cellular data network when a mobile device first initiates a request for a data session using a Simple IP protocol, or the mobile device must initiate an IP address discovery process using the Mobile IP protocol. In either case the cellular data network does not know of the routing location of the IP address for a mobile device until the mobile device first initiates a data session.

The core data network of any data enabled cellular network can use this unique invention to initiate a data transfer session, which we will call a Network Initiated Data Session (NIDS) and is described as follows:

According to one aspect of the invention, in-band signaling methods and apparatus are employed to "push" a request to a mobile unit or "node". We call this a Mobile Terminated (MT) request. (The mobile device is of course in-band signaling enabled, meaning essentially that it can send and receive digital data through the voice channel of a wireless network.)

The receiving mobile unit (mobile node) detects—and triggers the mobile device (or other system coupled to the mobile device) to initiate a data session with the cellular network using an available data channel, not the voice channel, to transmit data to a specified (or default) destination.

When a request is made of the mobile device, by using voice channel signaling, the network can initiate a data session between the mobile device and any network or internet entity at any time using the voice channel of the cellular network, or any other radio frequency derived audio channel where voice channel signaling functions. Due to the real time speed and quality of service of in-band (voice channel) services, a distinct time savings and reliability advantage can be made over any other approach for network initiated data sessions. These advantages are of paramount importance for public safety and security applications.

The present invention is also independent of any digital cellular technology and is not tied to any individual cellular carrier's voice, data, or messaging service, which is also unique and advantageous offering greater cellular coverage capabilities when compared to existing approaches.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
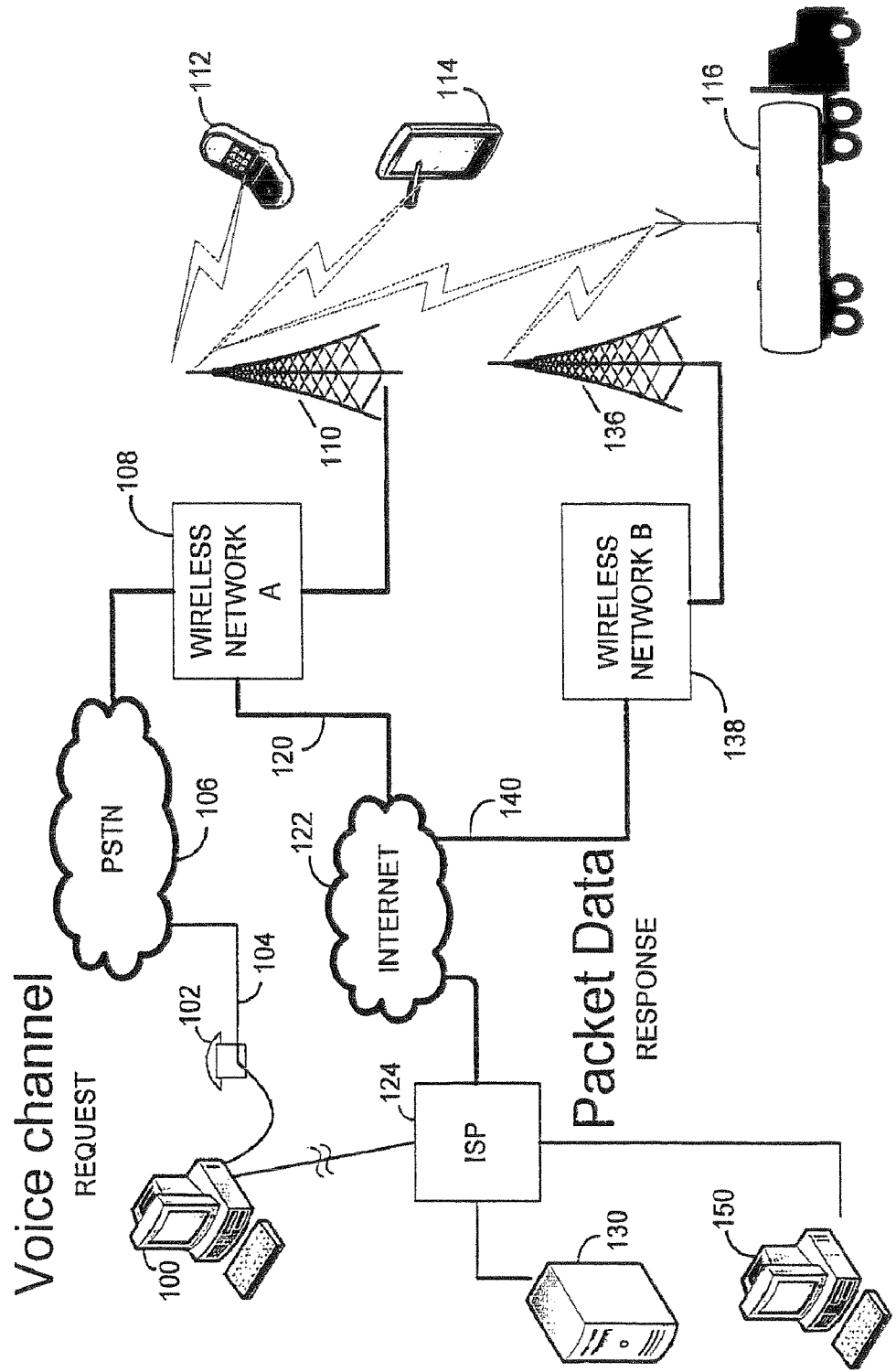
FIG. 1 is a simplified high-level diagram illustrating operation of representative embodiments of the invention.

Reference is now made to the figures in which like reference numerals refer to like elements. For clarity, the first digit of a reference numeral indicates the figure number in which the corresponding element is first used.

In the following description, certain specific details of programming, software modules, user selections, network transactions, database queries, database structures, etc., are provided for a thorough understanding of the embodiments of the invention. However, those skilled in the art will recognize that the invention can be practiced without one or more of the specific details, or with other methods, components, materials, etc.

In some cases, well-known structures, materials, or operations are not shown or described in detail in order to avoid obscuring aspects of the invention. Furthermore, the described features, structures, or characteristics may be combined in any suitable manner in one or more embodiments.

FIG. 1 is a simplified high-level diagram illustrating certain embodiments of the methodology of the present invention. Referring to FIG. 1, a requester application program can be provided on a suitable computer 100. The request or polling application can be activated by a user as needed or pre-programmed for automatic operation at scheduled times. The computer system 100 is coupled to a telephone line which may include a conventional telephone 102 and in any event is connected via 104 to the public switched telephone network PSTN 106. This connection can be, for example, an ordinary telephone land line as is commonly used for voice calls. It could also be part of a larger enterprise system that may involve a PBX (not shown), or it may be a wireless telecom connection.

A wireless carrier network 108 is connected to the PSTN 106 for handling wireless call traffic, the details of which are well known. The wireless network 108 includes a series of base stations which include antennas and wireless transceivers, generally referred to as a cell tower 110. Transceivers are mounted atop the cell tower 110 for two-way wireless communications with various wireless mobile devices such as a cell phone 112 or PDA 114. The base station antennas need not literally be mounted on a tower. In urban areas, in particular, they are more commonly affixed to buildings.

In accordance with the invention, a requester or a requester application executing on computer 100 initiates a voice telephone call, via the PSTN or wireless, directed to a remote mobile unit such as the cell phone 112. The connection from the requester application need not be hard wired to the PSTN but could itself be a wireless telephone link. The requester system 100 also may have access to the Internet 122, typically through an ISP (internet service provider) 124. The connection to the ISP could take any of various forms, for example utilizing cable or the PSTN network, as are known.

According to a preferred embodiment of the invention, a method is provided for polling the remote wireless unit as follows: First, the requester system 100 initiates a voice call to the remote wireless station. This of course requires that the telephone number of the device is known. Other kinds of mobile devices, such as the PDA 114 or even a motor vehicle 116 can include an apparatus that is configured to interact with the wireless network as if it were a cell phone, although it may not actually include a microphone or a speaker. For example, devices can be configured to automatically answer a wireless call, and provide the control channel signaling to emulate answering a cell phone. Once a voice call is established between the requester 100 and the remote wireless unit 112, the requester system 100 transmits a digital request message to the remote wireless terminal via the wireless voice channel on which the voice call is established. In other words, the digital request message is sent "in band" through the use of audio frequency tones that are arranged so that they will pass through the voice channel unobstructed.

The request message preferably includes a payload that identifies a target resource. In the remote wireless unit, for example 112, 114, apparatus or software is implemented that will respond to the digital request message by initiating a packet data session with the target resource identified in the request message. By "packet data session" we mean a data transfer session that utilizes one or more of the data services provided by the wireless carrier, as distinguished from voice services.

The target resource may be, but is not limited to, the requester system 100 itself. In other words, the wireless terminal 112 may be instructed to initiate a packet data session back to the requester system. That session would traverse link 120 from the wireless network infrastructure to the Internet 122 and thence to the requester 100 via the ISP 124. As noted, this process can be automated by implementing suitable software at the requester 100 and at the wireless unit 112 so that it can occur without user action at either end of the packet data session.

The target resource can be identified in the request message by a predetermined identifier, such as a simple alphanumeric name or code. The wireless terminal software can perform a look-up in memory to determine a corresponding URL or IP address. Alternatively, the target URL or IP address can be included in the request message itself.

The target resource need not be the requesting system 100. In one alternative embodiment, it could be a server 130 which is coupled to the Internet through an ISP and configured to perform data collection, utilizing standard packet data session protocols such as the Internet protocol. The target may be a web server suitably configured to interact with the mobile unit.

In other embodiments, the request message payload can include various delivery parameters, in addition to identification of a target resource. The delivery parameters might include, by way of example and not limitation, a preferred packet data service, a packet data rate, and/or a priority parameter. These parameters can be recovered from the message payload by the wireless terminal software and it can initiate a responsive packet data session in accordance with those parameters. For example, in the case of a relatively low priority parameter, the application software might select a data service or time of day to initiate the packet data session that is lower performance but incurs lower cost.

Referring again to FIG. 1, the tanker truck 116 is merely illustrative of a wide variety of mobile assets, including but not limited to motor vehicle assets, that could participate in the present system, assuming they are outfitted with a wireless unit as explained above. FIG. 1 also shows a second wireless base station tower 136 illustrating that the packet data session need not involve the same base station, or even the same wireless carrier, as that which carried the request message via the voice channel. The requested packet data session could occur through a second wireless network 138 which is also coupled to the Internet via 140. And again, the packet data session could be established with any target resource, including but not limited to the requester application 100 or a separate server 130.

In other embodiments of the invention, a live user or operator at a computer 150, having access to the Internet, could poll one or more remote wireless units to request a data transfer. For example, a user at say a public safety location such as a 911 emergency call taker, could access a web server (not shown) which has voice call telephone access such as 104. Through the means of a suitably programmed web page interface (using, for example, CGI scripting or the like), a user at 150 could initiate a request message which would take the form of a voice call from the web server, through the PSTN and the wireless network as described above, to a remote or mobile unit. The request message could include identification of the call taker center at 150 as the target resource to deliver requested information via a packet data session.

The present invention is not limited to downloading data from the wireless terminal to the requester. The requested packet data session could also be used to download information to the wireless terminal.

Figure 2:
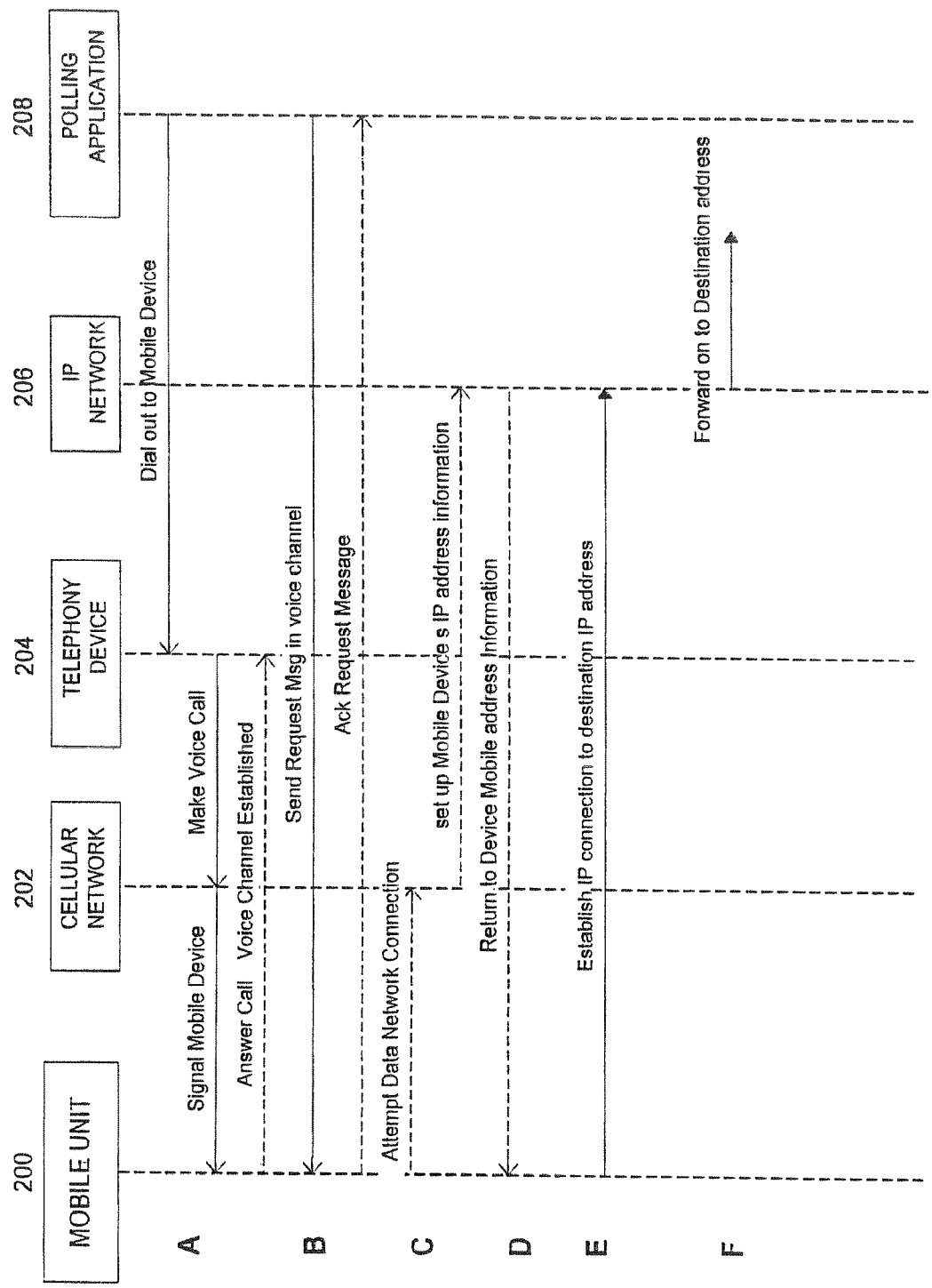
FIG. 2 is a messaging diagram showing principle interactions among nodes involved in an embodiment of the invention.

FIG. 2 is a messaging diagram that further illustrates principle features and characteristics of certain embodiments of the invention.

Referring to FIG. 2, a signaling or message flow diagram further illustrates methodologies in accordance with the present invention. Beginning with "time interval A" and initiating application 208 essentially places a voice call out to the mobile telephony device 204. As noted above, the initiating application could be a software application deployed on a computer or on a server and it may or may not necessarily require a conventional telephone. It does require access to the wireless network, directly or through the PSTN. The telephony device, in turn, makes a voice call through the cellular network 202 which in turn makes a wireless call to the mobile unit 200. The mobile unit answers the call, thereby establishing a voice channel "connection" back to the telephony device 204. Once that voice call is established, the initiating application, at "time interval B" transmits a request message in the voice channel to the mobile device 200. Optionally, the mobile device may respond with an acknowledgement message in the voice channel.

Referring now to "time point C," responsive to the request message, the mobile terminal 200 initiates a data network connection, which traverses the cellular network 202 and establishes a packet data session via the IP network 206. Here, the target or destination resource is coupled to the IP network 206. The IP network in turn responds to the mobile node 200 at "time point D" and then, as indicated at "time point E" a packet data session is established between the mobile node 200 and the IP network or target 206. "Time point F" indicates that the IP resource may not be the ultimate recipient of the data, but rather, it could be configured to forward that data to an ultimate destination address which may be, but is not limited to, the initiating application 208.

The process used by the core data network, internet application, or stand alone device to initiate a data session using aqLink begins with the establishment of a circuit switched voice channel connection to the mobile device. This can be accomplished by any means made available to the initiating application or device.

It will be obvious to those having skill in the art that many changes may be made to the details of the above-described embodiments without departing from the underlying principles of the invention. The scope of the present invention should, therefore, be determined only by the following claims.

The invention claimed is:

1. A method, comprising:
    establishing a voice call session between a requester unit and a wireless unit, the voice call session established on a wireless voice channel of a telecommunications network;
    after the voice call session is established between the requester unit and the wireless unit, transmitting a digital polling message from the requester unit to the wireless unit via the wireless voice channel;

including a payload in the digital polling message, wherein the digital polling message is transmitted in-band over the wireless voice channel separately from an out-of-band control channel, and wherein the payload is encoded as audio frequency signals selected to pass through the wireless voice channel unobstructed by vocoders operating in the telecommunications network; and in the wireless unit, responsive to the digital polling message, initiating a data session with a target.

2. The method according to claim 1, wherein a location of the target is carried in the payload in the digital polling message so as to enable the wireless unit to initiate the data session.

3. The method according to claim 1, wherein the payload in the digital polling message includes a network address of the target usable for initiating the data session with the target.

4. The method according to claim 3, wherein the network address comprises a Uniform Resource Locator (URL) carried in the payload, the URL represented by the audio frequency signals.

5. The method according to claim 3, wherein the network address comprises an Internet Protocol (IP) address carried in the payload, the IP address represented by the audio frequency signals.

6. A method for pulling data from a remote wireless unit, the method comprising:

transmitting a digital polling message to the wireless unit;

including a target address in the polling message; and in the wireless unit, in response to the polling message, initiating a wireless network data session with the target address in response to receiving the digital polling message and without manual user intervention at the wireless unit, the wireless network data session to be used by a computing device associated with the target address to pull data from the wireless unit over the wireless network data session.

7. The method according to claim 6, wherein the polling message is transmitted in-band in a voice channel call via a digital wireless telecommunications network, and the polling message includes at least one delivery parameter, the delivery parameter represented by the audio frequency signals.

8. The method according to claim 7, wherein the delivery parameter specifies at least one of a selected wireless network packet data service, a data rate and a priority parameter.

9. The method according to claim 6, wherein the polling message identifies a type of data to be transmitted from the wireless unit to the target address in the wireless data session.

10. The method according to claim 9, wherein the type of data to be transmitted is data indicating a location of the wireless unit.

11. An apparatus, comprising:

a processor coupled to a telecommunications network; and a polling requester application executable on the processor for sending a polling message through a wireless voice channel of the telecommunications network, wherein the polling message is represented by audio frequency signals selected to pass through the wireless voice channel unobstructed by vocoders operating in the telecommunications network;

wherein the polling message is configured to cause a wireless unit to initiate a data session with a target responsive to recovering the polling message from the voice channel.

12. The apparatus of claim 11, wherein the polling requester application transmits a payload in the polling message.

13. The apparatus of claim 12, wherein the polling requester application identifies the target in the payload and information for initiating the data session with the target.

14. The apparatus of claim 12, wherein the payload includes indicia of at least one data session parameter.

15. A machine readable medium encoded with instructions that, if executed by a processor, result in:

processing a received voice call in a wireless unit via a wireless telecommunications network;

recovering a request message from the voice call, wherein the request message is encoded as audio frequency signals transmitted in-band in a wireless voice channel of the received voice call, wherein the audio frequency signals are received over the wireless voice channel and separately from an out-of-band control channel; and responsive to the recovered request message, initiating a data session between the wireless unit and a target resource for uploading data using a digital wireless data service.

16. The machine readable medium according to claim 15, wherein the instructions further result in downloading data to the wireless unit in the data session.

17. The machine readable medium according to claim 15, wherein the data session is initiated with a predetermined network resource in response to recovering the request message.

18. The machine readable medium according to claim 17, wherein the network resource is identified by a Uniform Resource Locator or an Internet Protocol address in the request message.

19. The machine readable medium according to claim 15, wherein the recovered request message includes a network address of the target resource.

20. The machine readable medium according to claim 15 wherein the wireless unit comprises a cell phone.

* * * * *

UNITED STATES PATENT AND TRADEMARK OFFICE
CERTIFICATE OF CORRECTION

PATENT NO. : 7,733,853 B2 Page 1 of 1
APPLICATION NO. : 12/372255
DATED : June 8, 2010
INVENTOR(S) : Kamyar Moinzadeh et al.

It is certified that error appears in the above-identified patent and that said Letters Patent is hereby corrected as shown below:

Page 3, column 1 (U.S. Patent Documents), line 46:  Delete "Joong" and insert -- Joong et al. --, therefor;

Page 3, column 2 (U.S. Patent Documents), line 51:  Delete "Ericsson" and insert -- Jansson et al. --, therefor, and Column 8, line 50 (Claim 20):  After "15" insert -- , --.

Signed and Sealed this

Thirtieth Day of November, 2010

David J. Kappos
*Director of the United States Patent and Trademark Office*